United States Patent
Chang et al.

(10) Patent No.: US 12,513,537 B2
(45) Date of Patent: Dec. 30, 2025

(54) EVENT-BASED MINIMUM DRIVE TEST (MDT) LOG

(71) Applicant: Kyocera Corporation, Kyoto (JP)

(72) Inventors: Henry Chang, San Diego, CA (US); Masato Fujishiro, Yokohama (JP)

(73) Assignee: Kyocera Corportion, Kyoto (JP)

( * ) Notice: Subject to any disclaimer, the term of this patent is extended or adjusted under 35 U.S.C. 154(b) by 830 days.

(21) Appl. No.: 17/435,662

(22) PCT Filed: Mar. 25, 2020

(86) PCT No.: PCT/US2020/024569
§ 371 (c)(1),
(2) Date: Sep. 1, 2021

(87) PCT Pub. No.: WO2020/198279
PCT Pub. Date: Oct. 1, 2020

(65) Prior Publication Data
US 2022/0141679 A1    May 5, 2022

Related U.S. Application Data (60) Provisional application No. 62/825,630, filed on Mar. 28, 2019.

(51) Int. Cl.
| | |
|---|---|
| *H04W 24/02* | (2009.01) |
| *H04W 4/021* | (2018.01) |
| *H04W 16/18* | (2009.01) |
| *H04W 24/10* | (2009.01) |
| *H04W 76/20* | (2018.01) |

(52) U.S. Cl.
CPC .......... *H04W 24/02* (2013.01); *H04W 4/021* (2013.01); *H04W 16/18* (2013.01); *H04W 24/10* (2013.01); *H04W 76/20* (2018.02)

(58) Field of Classification Search
CPC ..... H04W 24/02; H04W 4/021; H04W 16/18; H04W 24/10
See application file for complete search history.

(56) References Cited

U.S. PATENT DOCUMENTS

| | | | |
|---|---|---|---|
| 9,585,047 B2 * | 2/2017 | Persson | H04W 24/08 |
| 2006/0255935 A1 * | 11/2006 | Scalisi | G06Q 10/08 340/539.13 |
| 2011/0201279 A1 | 8/2011 | Suzuki et al. | |
| 2011/0250880 A1 * | 10/2011 | Olsson | H04W 76/18 455/423 |
| 2013/0137379 A1 | 5/2013 | Jung et al. | |
| 2013/0189970 A1 * | 7/2013 | Fukuta | H04L 43/16 455/422.1 |
| 2013/0208617 A1 | 8/2013 | Fukuta | |
| 2016/0295438 A1 | 10/2016 | Chang | |
| 2018/0035322 A1 | 2/2018 | Yamine et al. | |

* cited by examiner

*Primary Examiner* — Mohammad S Anwar (57) ABSTRACT

A mobile wireless communication device (mobile device) receives a Minimization of Drive Test (MDT) configuration comprising criteria for performing event-based logging. The mobile device determines if the criteria have been met and, in response to a determination that the criteria have been met, performs an MDT in accordance with the MDT configuration. The MDT results are logged in the memory as an MDT log. The mobile device transmits, to a base station, a log availability indicator indicating the availability of the event-based MDT log.

16 Claims, 5 Drawing Sheets

EVENT-BASED MINIMUM DRIVE TEST (MDT) LOG

CLAIM OF PRIORITY

The present application claims priority to Provisional Application No. 62/825,630 entitled "Enhanced Availability Indicator For Logged MDT", filed Mar. 28, 2019, assigned to the assignee hereof, and hereby expressly incorporated by reference in its entirety.

FIELD

This invention generally relates to wireless communications and more particularly to minimization drive tests (MDT).

BACKGROUND

Wireless communication systems operating in accordance with various standards employ minimization drive tests (MDT) to improve wireless communication coverage. When new base stations are deployed, drive tests are performed before and after service activation of the new cell (base station). Initially, downlink/uplink (DL/UL) coverage measurements of the new cell and neighbor cells are made in the intended area of coverage improvement. During this phase, initial area tuning is performed (e.g. selection of an appropriate antenna for the new cell, adjustment of antenna tilting of the new cell and neighbor cells, etc.). Service with the new cell will be started after such initial tuning. Drive tests are performed to collect more extensive data of DL/UL coverage measurements in the intended area to confirm that adequate DL/UL coverage is being provided. In order to reduce the rigorous drive tests that are needed to collect downlink/uplink coverage measurements Minimization of Drive Test (MDT) are used to gather data. Using an MDT procedure, measurements can be collected from user equipment (UEs) (mobile devices) without the need for the extensive drive tests. As a result, the MDT can reduce network maintenance costs for operators, ensure a faster optimization cycle resulting in higher customer satisfaction and help to reduce the carbon emission to protect the environment. Furthermore, MDT enables operators to collect measurements from areas which are not accessible for drive tests (e.g. narrow roads, forests, private land/house/office). Other uses of MDT include mobility, capacity, QoS optimizations. In order to collect measurements from the mobile communication device, the device must be configured with the MDT parameters. The MDT configuration parameters typically include indicators of what parameters to measure, the time stamp of the log, how long the measurement should last and what parameters to report. For some standards defined by the 3rd Generation Partnership Project (3GPP), the Radio Resource Control (RRC) include RRC_CONNECTED and RRC_IDLE. The standards for 5G or New Radio (NR) define a new state for the UE device of inactive (RRC_INACTIVE). RRC_INACTIVE is a state where the UE device remains in a connected management connected state (CM-CONNECTED) and can move within an area configured by the New Generation (NG)-Radio Access Network (RAN) RAN-based Notification Area (RNA) without notifying the NG-RAN. The RRC_INACTIVE state, therefore, is a new RRC state in NR that is in addition to RRC_IDLE and RRC_CONNECTED. Connection Management (CM) is used to establish and release the control plane signaling connection between the UE device and the Access Management Function (AMF). The Connection Management depicts UE device status with respect to its signaling with AMF 5G Core Node. Connection Management is used to transfer NAS signaling messages. Signaling Connection between the UE device and the AMF is based on the Uu interface sometimes known as a N1 logical interface and it is a combination of 1) RRC signaling between the UE and the gNB and 2) N2-AP signaling between the gNB and the AMF. The 3GPP has defined two Connection Management State for the UE device and AMF including Connection Management-Idle (CM-IDLE) and Connection Management-Connected (CM-CONNECTED). The CM-IDLE and CM-CONNECTED states are maintained at the NAS layer at both the UE device and the AMF. When the UE device is in the RRC_INACTIVE state, therefore, it is still in the CM_CONNECTED state. In RRC_INACTIVE, the last serving gNB node keeps the UE context and the UE-associated NG connection with the serving Access and Mobility Management Function (AMF) and the User Plan Function (UPF). A UE device in the RRC_INACTIVE state is required to initiate the RNA update procedure when it moves out of the configured RNA. When receiving an RNA update request from the UE device, the receiving gNB triggers the XnAP Retrieve UE Context procedure to get the UE context from the last serving gNB and may decide to send the UE device back to RRC_INACTIVE state, move the UE device into RRC_CONNECTED state, or send the UE device to RRC_IDLE. In at least some systems, MDT is performed in both the Idle and Inactive states.

SUMMARY

A mobile wireless communication device (mobile device) receives a Minimization of Drive Test (MDT) configuration comprising criteria for performing event-based logging. The mobile device determines if the criteria have been met and, in response to a determination that the criteria have been met, performs an MDT in accordance with the MDT configuration. The MDT results are logged in the memory as an MDT log. The mobile device transmits, to a base station, a log availability indicator indicating the availability of the event-based MDT log.

DETAILED DESCRIPTION

As discussed above, the MDT assists the network in gathering information regarding the communication system. In conventional systems, a mobile device sends an availability indicator to the base station when re-establishing the Connected state. Current MDT reporting techniques allow for the mobile device to report the availability of an MDT report with the availability indicator and for the communication system infrastructure to retrieve the MDT log report at an appropriate time, preferably when the system is not congested. The communication system infrastructure will have up to 48 hours to retrieve the log from the time the log duration timer expires or if the mobile device's memory is full before the mobile device is allowed to discard the logged data from memory. The logged data is currently limited to 64 KB. In the existing Logged MDT, the size of the logged data is predictable considering the logged data is mainly to monitor and detect coverage problems. The communication system infrastructure, therefore, can anticipate the maximum amount of data in the report retrieval when deciding whether to retrieve a log. In many situations, it is advantageous to include additional information in MDT log. For example, in some systems such as NR 5G, information regarding mobile device orientation, a best beam, a received signal quality of the best beam, out-of-coverage conditions during the MDT, cells included in the MDT log, and/or geographical location of the mobile device during the MDT may be useful. This additional information, however, will increase the size of the MDT log. In some current systems, the transport of Logged MDT reports can be completed in multiple RRC messages since the mobile device may indicate remaining data availability in the UEInformationResponse message during MDT report retrieval in case the mobile device has not transferred the entire log in one RRC message. Where the communication system infrastructure does not retrieve all the logged information, the mobile will retain unreported logged information and will continue to send availability indications at every connection and handover.

For examples discussed herein, however, the mobile device provides information regarding the MDT data in the log. The information assists the communication system infrastructure to make decisions regarding when and if to retrieve the MDT log. In one example, the log availability indicator includes a log size that indicates the size of the MDT log that is available. The communication system infrastructure evaluates the log size in determining when to retrieve the log. In some circumstances, the communication system infrastructure may determine to retrieve the log based on the size.

As discussed below, the mobile device may also indicate the type of MDT data that has been logged in the MDT log. The data type indicator may indicate that the MDT data is regarding a mobile device orientation, a best beam, a received signal quality of the best beam, out-of-coverage conditions during the MDT, cells included in the MDT log, and/or geographical location of the mobile device during the MDT.

In other examples discussed below, the MDT log is event-based where the MDT is performed in response to detection by the mobile device of a circumstance or event. In some situations, the data type indicator provided by the mobile device indicates that MDT data includes data associated with a particular event-based MDT. For example, the MDT log may be triggered by the mobile device being in a particular location and the data type indicator may indicate that the MDT log contains data associated with the location. And as with typical event-based MDT, a signal strength-based event triggering such as RSRP may also be configured for the location of interest. In which case, the mobile device will only log if both the location and signal strength meet the event-based triggering criteria for logging. In some cases, the network is only interested in logging measurements that are below a certain signal threshold for a given location to reduce the memory burden on mobile devices. After receiving the information regarding the type of data from the mobile device, the communication system infrastructure can determine that the event-based MDT log was performed.

Figure 1:
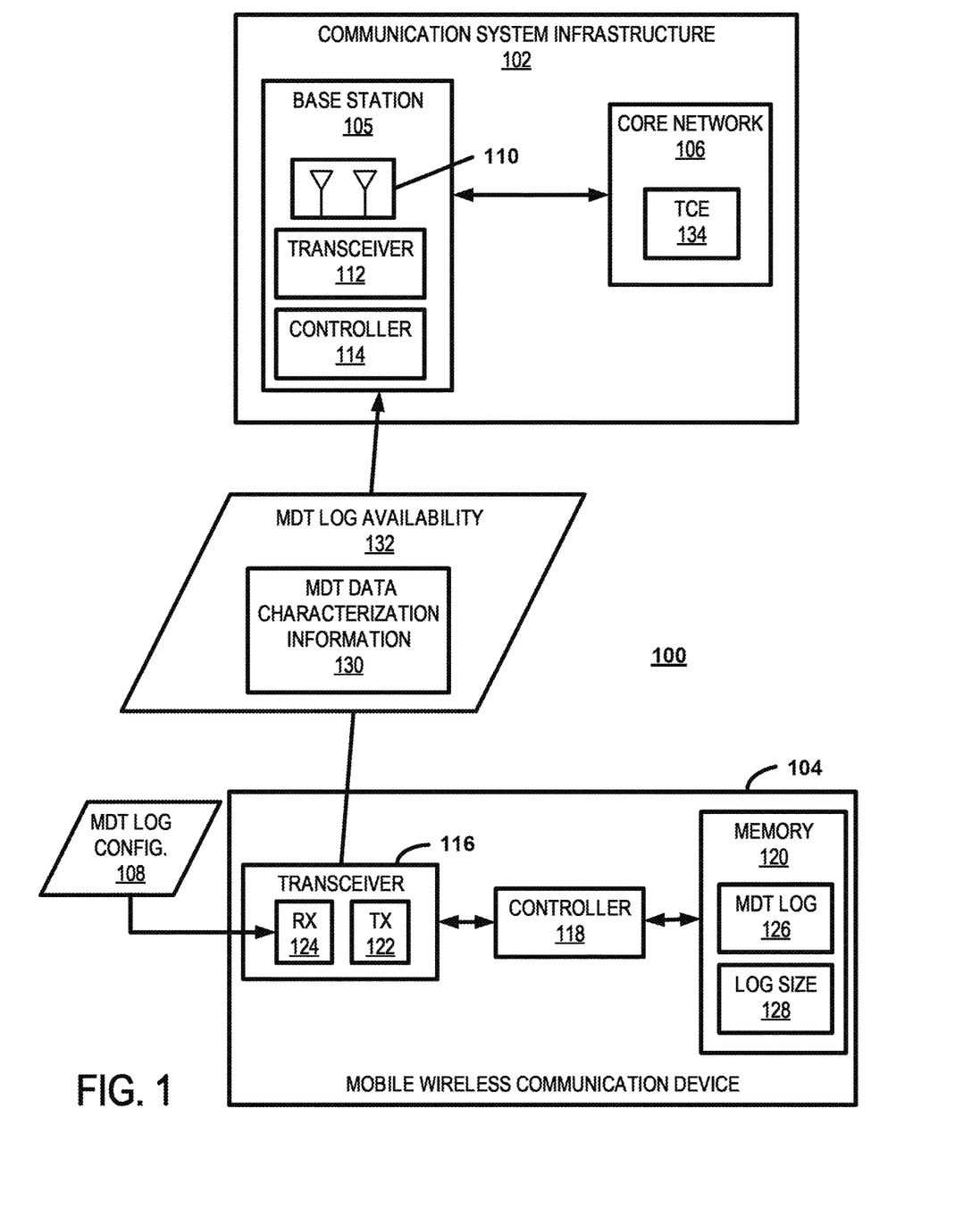
FIG. 1 is a block diagram of a communication system including communication system infrastructure and a mobile wireless communication device (mobile device).

FIG. 1 is a block diagram of a communication system 100 including communication system infrastructure 102 and a mobile wireless communication device (mobile device) 104. The communication system infrastructure 102 includes at least one base station 105 and a core network 106. Typically, the communication system infrastructure 102 includes several base stations connected to the core network 106 through a backhaul (not shown) to provide wireless communication services to several mobile devices. The base station 105 transmits and receives control and data signals to and from user equipment mobile wireless communication devices (UE devices) (mobile devices) 104 and may be referred to as an eNodeB, eNB, gNB, transceiver station, access point, and other terms depending on the particular type of system. For the example of FIG. 1, the mobile device 104 has received an MDT log configuration 108 and has performed the MDT in accordance with the MDT log configuration while in the idle or inactive state. The MDT log configuration 108 is received from the last serving base station which is typically a base station other than the base station 105 but, in some situations, may be the base station 105.

The base station 105 includes at least an antenna system 110, a transceiver 112, and a controller 114. Although the antenna system 110 may only include a single antenna, the antenna system 110 may include multiple elements or antennas and is typically controllable such that the antenna radiation and reception patterns can be adjusted. The transceiver 112 includes electronics for transmitting downlink signals and receiving uplink signals through the antenna system 110. The controller 114 is any combination of electronics, processors, and/or processor arrangements that runs code to perform base station functions described herein as well as facilitate the overall operation of the base station. The base station 105 may communicate with other base stations through a backhaul. An example of a suitable communication technique includes using X2 or Xn messaging. Accordingly, the base station also includes communication interface equipment for communicating with other base stations. For the examples discussed herein, the base station 105 and communication infrastructure operate in accordance with at least one revision of the 3rd Generation Partnership Project (3GPP) 5G specification, such as New Radio (NR), standards and protocols.

The MDT logging procedure is discussed with reference to a single mobile wireless communication device (mobile device) 104 for the examples herein although multiple devices may perform the MDT for a particular coverage region. The mobile wireless communication devices (mobile devices) 104 include devices such as wireless telephone devices, sometimes referred to as handsets or cell phones, as well as other devices such as wireless personal digital assistants (PDAs), laptop computers, tablets and wireless modems. The mobile devices are sometimes referred to as user equipment (UE) and UE devices.

Each mobile wireless communication device (mobile device) 104 includes at least a transceiver 116, a controller 118, and memory 120. A transmitter 122 and receiver 124 of the transceiver 116 include electronics for transmitting and receiving signals, respectively. The transmitter 122 and receiver 124 may include any combination of hardware, software, and/or firmware. In most circumstances, the mobile wireless communication devices 104 also include input and output devices such as, for example, visual displays, keyboards, touch screens, microphones and speakers (not shown).

As discussed above, the MDT procedure provides a means for collecting data that can be used to optimize system performance. As is known, antennas 110 and other equipment at one or more base stations is adjusted based on the data provided by mobile wireless communication devices 104 and acquired during the MDT procedure. The information regarding the quality of received signals provided by the mobile wireless communication devices 104 is used to improve communication coverage in the desired areas. Adjustments may be made to multiple base stations to reduce interference and increase signal power within the desired regions. For example, the antenna of a serving base station providing the communication service may be adjusted to increase signal strength in a service area of the base station and the antenna of a nearby interfering base station (not shown) may be adjusted to reduce signal from the interfering base station in the service area of the serving base station.

For the examples herein, the mobile device 104 enters the inactive state or idle state while connected to a serving base station and performs the MDT in accordance with the MDT log configuration 108. The mobile device maintains an MDT log 126 in memory 120 where the mobile device 104 periodically records the signal strength of the serving cell and neighbor cells, the location of the mobile device, and a time stamp in idle. For the examples herein, the MDT logging procedure is also performed in the inactive state. In some situations, the mobile device 104, however, may only be able to perform MDT in the idle state. In one example, a single log is maintained for both states and the mobile device 104 includes information in the log identifying the state corresponding to the logged information. For at least some examples herein, the mobile device maintains the log size 128 of the MDT log 126 in memory 120. In some examples, the MDT log 126 includes additional information compared to conventional MDT logs. As discussed below in further detail, the MDT log may include information related to beam selection and quality, mobile device orientation, detailed location information, as well as other data. In some examples, the MDT logging is an event-based MDT logging where at least some components of the MDT are triggered, prompted, or otherwise based by events or circumstances at the mobile device. As a result, the MDT log 126 includes data related to the event-based MDT logging in some situations.

During reestablishment or establishment to the connected state, the mobile device sends MDT characterization information 130 regarding the MDT data contained in the MDT log 126. Although the MDT characterization information 130 is transmitted in the MDT log availability message 132 in the examples, the information 130 may be transmitted to a base station in the communication system infrastructure 102 using other techniques in some situations. As discussed below, the MDT characterization information 130 may include a log size of the MDT log and/or an MDT data type identifier identifying the type of data included in the MDT log that is available for retrieval.

The communication system infrastructure evaluates the MDT characterization information 130 and determines whether to retrieve the MDT log at least partially based on the MDT characterization information 130. For example, the decision to retrieve may be based on the size of the log and the current traffic load at the base station 105. In other situations, the decision may be based on the type of MDT data in the log 126. For example, the infrastructure 102 may determine to retrieve the MDT log only if data is available related to a particular location or cell. The decision to retrieve the MDT log may be performed by the controller 114 in the base station 105, the core network 106, or a combination of the two. In most situations, the base station retrieves the MDT log and notifies Trace Entity (TCE) 134 in the core network 102 that the MDT log report is available. The TCE 134 can retrieve the MDT log report from the base station 105. The base station may determine whether to retrieve the MDT log based on current conditions at the base station 105, and/or instructions provided by the TCE 134. For example, the base station 105 may receive instructions, or pre-configuration, from the TCE to retrieve MDT data related to a particular geographical location. When the mobile device indicates that MDT data is available from that location and provides an MDT log size, the base station 105, may decide to retrieve the MDT log report based on the TCE instructions but only at a particular time because of traffic load conditions at the base station 105. In some situations, the base station 105 reports the MDT characterization information 130 to the TCE 134 and the TCE 134 indicates to the base station 105 whether to retrieve the MDT log report. The TCE 134 is an entity, therefore, that includes processing functionality and includes a processor, processor arrangement, controller, or other processing device.

Figure 2:
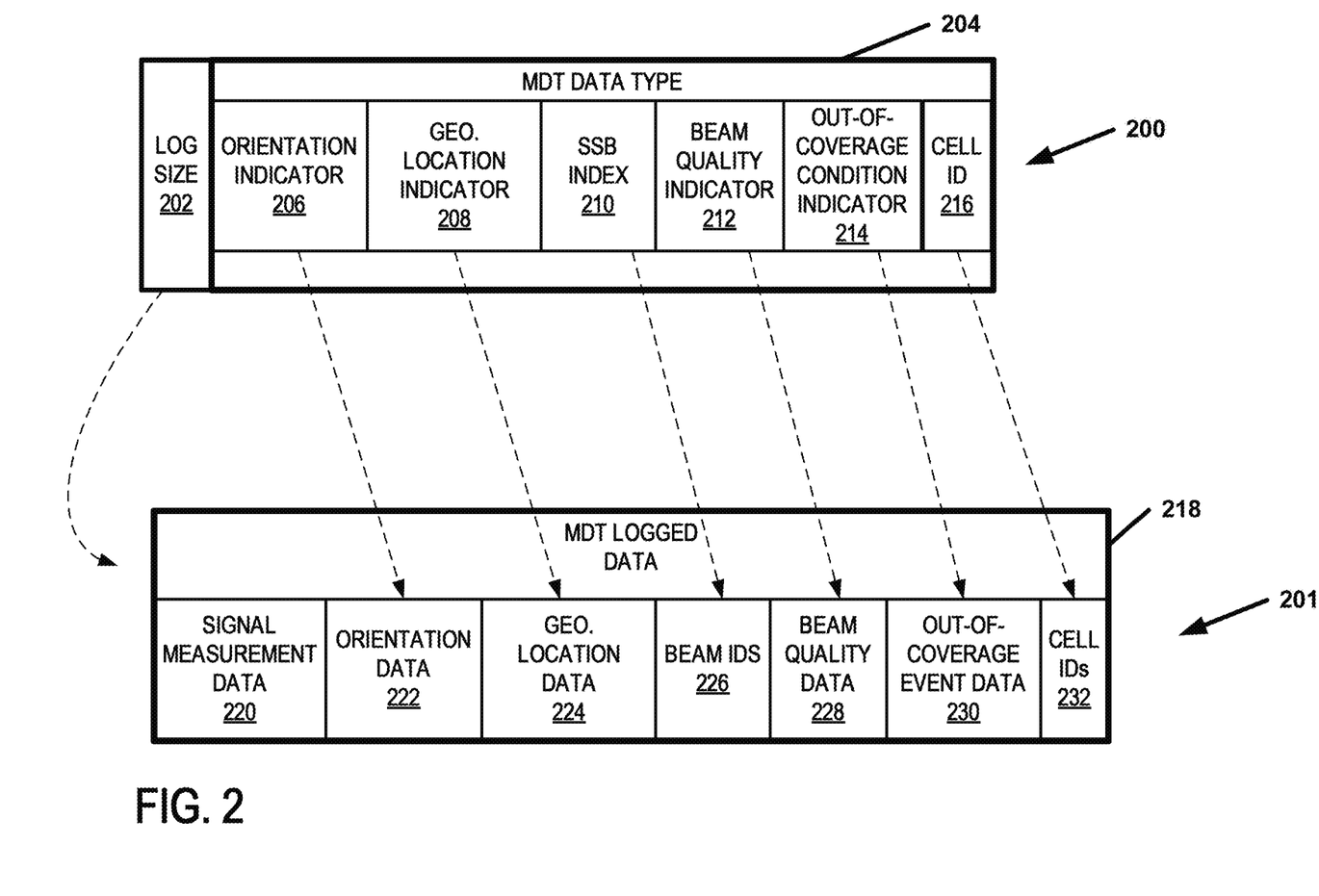
FIG. 2 is block diagram of an example of an MDT data characterization message and an MDT log.

FIG. 2 is block diagram of an example of an MDT data characterization message 200 and an MDT log 201. The MDT data characterization message 200 of FIG. 2, therefore, is an example of message including the MDT data characterization information 130 discussed above and the MDT log 201 is an example of the MDT log 126 discussed above.

For the example, the MDT data characterization message 200 is sent as part of the MDT log availability message 132 and includes a plurality of indicators where at least one indicator is a log size indicator 202 and at least one other indicator is an MDT data type indicator 204. In some situations, only one of the log size indicator 202 or the MDT data type indicator 204 may be included in the MDT characterization message 200. The log size indicator 202 provides information regarding the size of the stored MDT log data 201. The MDT data type indicator 204 includes at least one of a plurality of MDT data type indicators. The MDT data type indicator 204 may include any combination of the plurality of indicators that include, for example, an orientation indicator 206, a geographical location indicator 208, an SSB index 210, a beam quality indicator 212, an out-of-coverage condition indicator 214 and a cell identifier (cell ID) 216. Each indicator provides information regarding the MDT data that is contained within the MDT log 201.

The MDT logged data 218 in the MDT log 201 includes signal measurement data 220 captured by the mobile device during the configured MDT logging procedure. The MDT log may include measurements associated with specific parameters, circumstances or events in addition to conventional measurements. The signal measurements, therefore, may be associated at least one of a plurality of parameters, circumstances or events. The signal measurement data 220 may be associated with any combination of parameters that include, for example, orientation data 222, geographical location data 224, beams identification data 226, beam quality data 228, out-of-coverage condition data 230 and a cell identification data (cell ID) 232. Therefore, the signal measurement data 220 is maintained in the MDT log for measurement criteria associated with at least one of the parameters. For example, the MDT signal measurements for a particular location are associated with the geographical location data 224. The MDT data type indicators in the MDT data characterization message 200 provide information regarding the corresponding data in the MDT logged data 218. Therefore, the orientation indicator 206 corresponds to the orientation data 222, the geographical location indicator 208 corresponds to the geographical location data 224, the SSB index 210 corresponds to the beams identification data 226, the beam quality indicator 212 corresponds to the beam quality data 228, the out-of-coverage condition indicator 214 corresponds to the out-of-coverage condition data 230, and the cell ID 216 corresponds to the cell identification data (cell ID) 232. The orientation indicator 206 indicates that measurements have been logged for particular UE orientation. As is known, many mobile devices include both a compass and a gyroscope which can be used to determine the orientation of the mobile device. The mobile device's orientation can be logged and reported to the base station. This allows the network to determine the received energy level with respect to the mobile device's orientation. In 5G NR systems, the transmitted signals from the base station are beamformed. Narrow pencil beams are used to transmit common signals and data channels. In NR, the transmitted signals are beamswept using a multitude of beams and the mobile device will determine and report back which of the beams is the best one to use to improve the link budget. By allowing mobile devices to not only report when and where a measurement was taken, but also from where energy was received based on orientation, the beamsweeping operation can be improved at the network.

The geographical location indicator 208 identifies the geographical location(s) of the mobile device when making MDT signal measurements. The location may be based on any of several types of descriptions of a location or geographical region. For example, the location may be indicated by a street address, GPS coordinates, or a mapping service marker code. The location data may be maintained for periodic logging or may be part of configured for even-based logging. Therefore, the location indicator 208 may indicate that measurements have been performed for configured locations of interest to the communication system infrastructure 102 without directly describing the location.

The SSB index 210 identifies beams for which signals were measured. The SSB index 210 may identify a best beam. The beam quality indicator 212 is associated with the quality of the measured signals for a beam where the quality may be measured as a beam level RSRP/RSRQ, for example. The out-of-coverage condition indicator 214 may indicate whether any out-of-coverage condition was logged where no suitable cell was found during the MDT logging. As a result, no signal measurements are logged for this parameter. The cell ID 216 may indicate the cells for which signals were measured during the MDT logging. The cell ID 216, therefore, provides cell specific information (for Signaling Based MDT) based on the Cell ID and informs the base station if measurements related to a particular cell of interest are included in the log.

Figure 3:
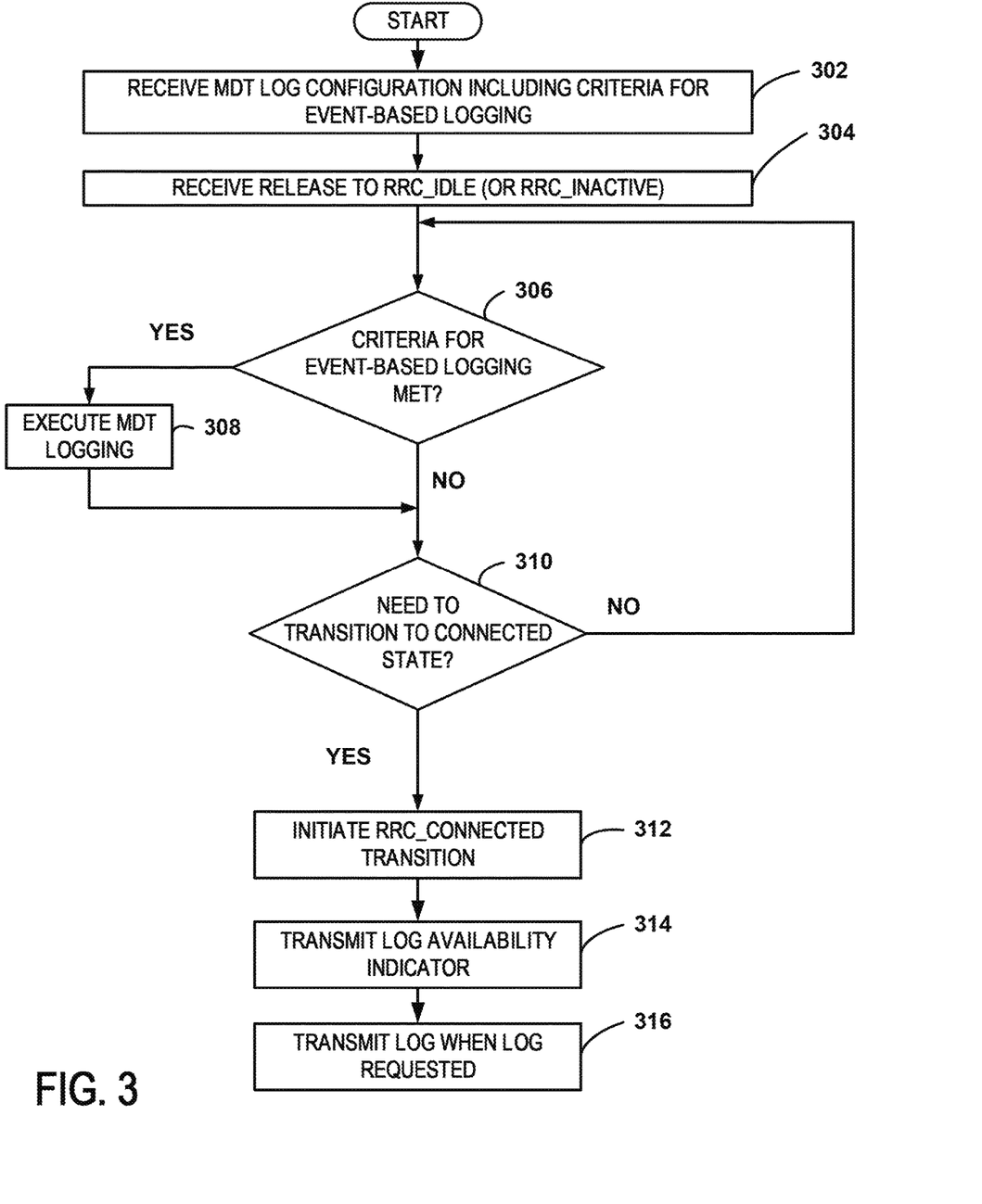
FIG. 3 is a flow chart of an example of a method for event-based MDT logging at a mobile device.

FIG. 3 is a flow chart of an example of a method for event-based MDT logging at a mobile device. Accordingly, the method can be performed by a device such the mobile device 104 discussed above including UE devices, handsets, wireless modems and other user equipment.

At step 302, an MDT log configuration is received. For the example, the mobile device 104 receives a message or information that configures the mobile device to perform MDT logging including the MDT logging during the inactive state and during the idle state. The MDT log configuration includes criteria for performing event-based logging. The criteria may be any type of condition or trigger where the mobile device is to perform logging when the condition is met or the trigger occurs. For some examples discussed herein, the criteria are based on the geographical location of the mobile device in addition to signaling based thresholds. The location criteria may include a specific location or may be a geographical region or zone. The location criteria may be defined using one or more street addresses, GPS coordinates, or mapping service marker codes. One technique includes providing a single geographical point and a defined range from the point. In some situations, the range can be omitted and a default range is used from the specified point. Another technique includes using three or more points to define geometric area or region. When the mobile device enters such a zone, the criteria is considered to be met.

Examples of other criteria include specifying particular cells, sectors, or beams where signals should be measured. For example, if the mobile device is within range of a particular cell, the criteria is considered to be met. The criteria may also be based on events at the mobile device. Such events may include exceeding a threshold number of failed re-connection attempts by the mobile device. For the examples herein, a signal-based threshold is part of the triggering condition.

At step 304, a Release to RRC_INACTIVE or a Release to RRC_IDLE is received. The mobile device receives a message with the Release to RRC_INACTIVE or Release to RRC_IDLE information from the last serving base station. The mobile device enters the INACTIVE or IDLE state after receiving the message.

At step 306, it is determined whether the criteria for the event-based logging has been met. The mobile device evaluates the current conditions and determines whether the specified criteria received in the MDT log configuration has been met. Where the event-based condition is location based, for example, the mobile device determines if the location of the mobile device is at the location or within the zone or region specified. If the condition is met, the MDT logging is executed at step 308 and the MDT log is maintained before proceeding to step 310. Otherwise, the method proceeds directly to step 310. In some cases, the event-based condition also includes signal strength-based triggering criteria.

At step 310, it is determined whether the mobile device should enter the connected state. For the example, the mobile device determines if the transition to RRC-CONNECTED should be initialized in accordance with known techniques. If reconnection is not required, the method returns to step 306. Otherwise, the method proceeds to step 312.

At step 312, the transition to RRC_CONNECTED is initiated. A resume request is transmitted to the base station. For the example, the mobile device transmits an RRCResumeRequest, RRCReestablishmentRequest or RRC RRCSetupRequest_in accordance with known techniques. Messages are exchanged with a base station. As part of the transition to RRC_CONNECTED, the mobile device sends a log availability indicator to the base station at step 314. The log availability indicator notifies the base station of the log reports that are available. For the example, the log availability indicator indicates whether an event-based MDT logg is available.

At step 316, the mobile device receives a log retrieval request from the base station and provides the requested report(s). For the example, the MDT log includes data logged during the inactive and idle states and indicates when the mobile device has changed states.

Figure 4:
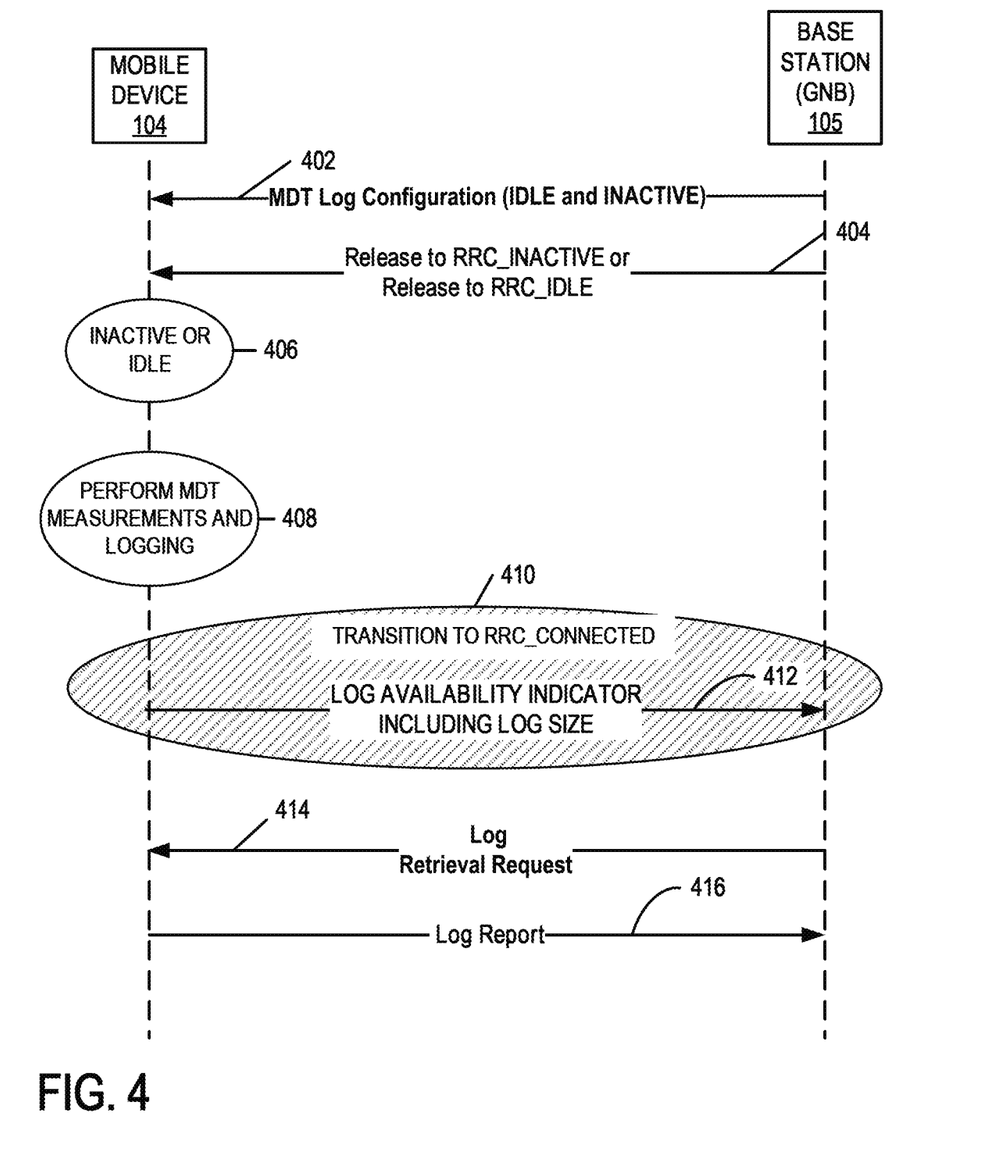
FIG. 4 is a messaging diagram of an example where the mobile device includes a log size of the MDT log in the log availability message transmitted to the base station.

FIG. 4 is a messaging diagram of an example where the mobile device 104 includes a log size of the MDT log in the log availability message transmitted to the base station.

At transmission 402, the base station 105 sends MDT Log configuration information to the mobile device 104. For the example, MDT log configuration configures the mobile device 104 for logging MDT during the inactive and idle states. In some situations, the logging procedure for both states is the same and the mobile device logs changes between states.

At transmission 404, the base station 105 transitions the mobile device to inactive or idle by sending either a Release to RRC_INACTIVE message or a Release to RRC_IDLE message.

At event 406, the mobile device 104 is in the INACTIVE state or IDLE state. While in the Inactive or Idle state, the mobile device maintains the MDT log at event 408. The mobile device performs signal measurements and logs the results in accordance with the MDT log configuration. The mobile device continues to maintain the MDT log in accordance with MDT log configuration while in the inactive or idle state.

At event 410, the mobile device transitions to RRC_CONNECTED from IDLE. In accordance with known techniques, the mobile device establishes the RRC_CONNECTED with the base station 105. As part of the transition, the mobile device transmits, at transmission 412, a Log Availability Indicator as part of the RRC Connection establishment procedure. For the example, the Log Availability Indicator indicates the availability of the MDT log and the size of the MDT log.

At transmission 414, the base station 105 sends a Log Retrieval Request. For the example, the size of the MDT log is evaluated by the base station and, if conditions are appropriate for receiving the log, send the Log Retrieval Request.

At transmission 416, the mobile device sends the MDT log report to the base station 105.

Figure 5:
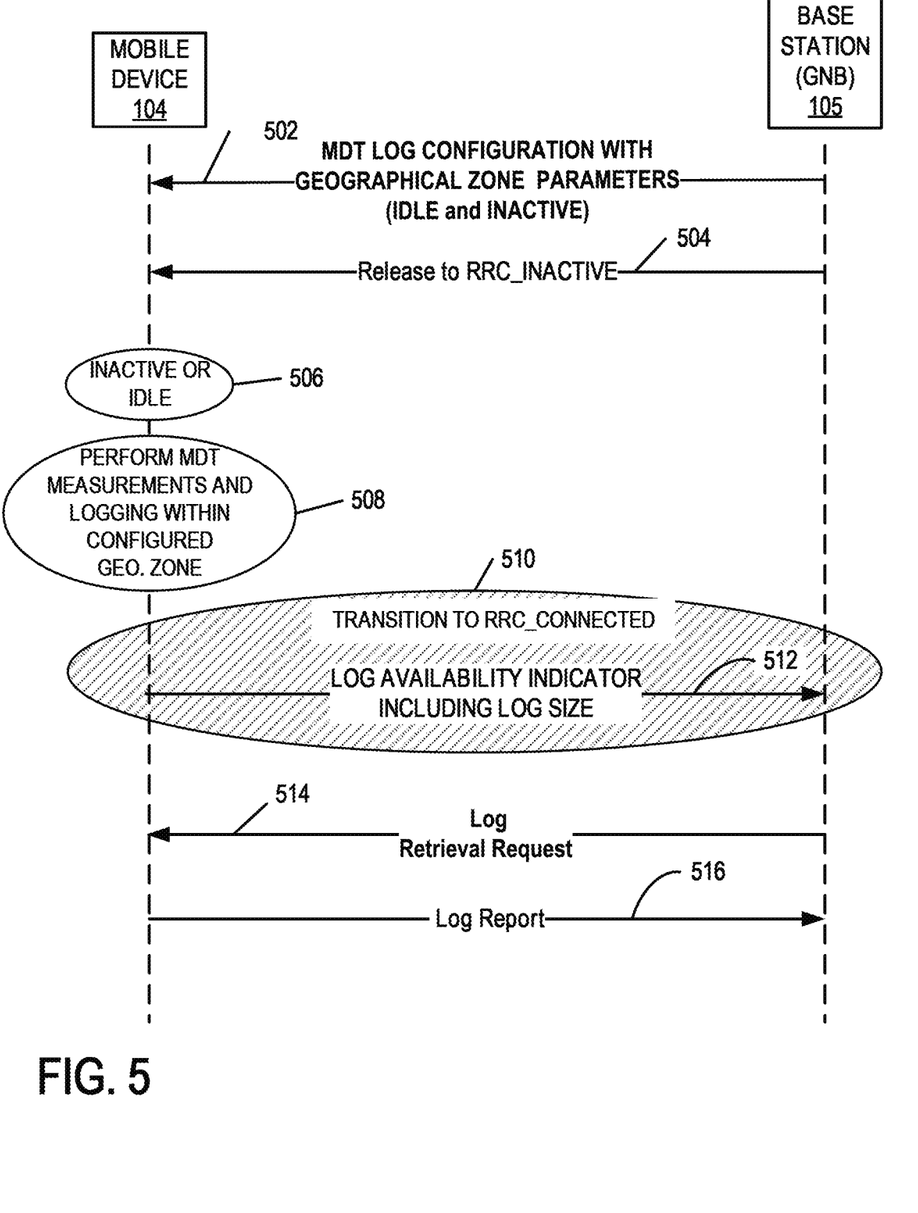
FIG. 5 is a messaging diagram of an example where the mobile device executes event-based MDT logging.

FIG. 5 is a messaging diagram of an example where the mobile device 104 executes event-based MDT logging. For the example for FIG. 5, the event-based criteria are related to the geographical location of the mobile device.

At transmission 502, the base station 105 sends MDT Log configuration information to the mobile device 104. For the example, MDT log configuration configures the mobile device 104 for logging MDT during the inactive and idle states. In some situations, the logging procedure for both states is the same and the mobile device logs changes between states. The MDT Log Configuration includes event-based logging criteria. For the example of FIG. 5, the event-based criteria are related to geographical location and the MDT Log Configuration includes geographical zone parameters defining or identifying at least one geographical zone or region. As discussed above, the parameters may include any combination of street addresses, GPS coordinates, and marker codes provided by a mapping service. The configuration, therefore, indicates that the mobile device should perform MDT logging when the mobile device is located within one of the defined geographical zones.

At transmission 504, the base station 105 transitions the mobile device to inactive or idle by sending either a Release to RRC_INACTIVE message or a Release to RRC_IDLE message.

At event 506, the mobile device 104 is in the INACTIVE state or IDLE state. While in the Inactive or Idle state, the mobile device maintains the MDT log at event 508. The mobile device performs signal measurements and logs the results in accordance with the MDT log configuration. The measurements, therefore, are performed when the mobile device is located within one of the defined geographical zones. The mobile device continues to maintain the MDT log in accordance with MDT log configuration while in the inactive or idle state.

At event 510, the mobile device transitions to RRC_CONNECTED from IDLE. In accordance with known techniques, the mobile device establishes the RRC_CONNECTED with the base station 105. As part of the transition, the mobile device transmits, at transmission 512, a Log Availability Indicator as part of the RRC Connection establishment procedure. For the example, the Log Availability Indicator indicates the availability of the event-based MDT log.

At transmission 514, the base station 105 sends a Log Retrieval Request.

At transmission 516, the mobile device sends the MDT log report to the base station 105.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A mobile wireless communication device comprising:
   a memory;
   a receiver configured to receive a Minimization of Drive Test (MDT) configuration comprising criteria for performing event-based logging, the criteria comprising a received signal threshold and the criteria being met when a signal strength of a received signal exceeds the received signal threshold;
   a controller configured to:
      determine if the criteria have been met, and
      in response to a determination that the criteria have been met, perform an MDT in accordance with the MDT configuration, and log results of the MDT in the memory as an MDT log;
   a transmitter configured to transmit, to a base station, a log availability indicator indicating the availability of the MDT log.

2. The mobile wireless communication device of claim 1, wherein the criteria comprise a defined geographical location, the criteria being met when the mobile device is at the defined geographical location.

3. The mobile wireless communication device of claim 2, wherein the defined geographical location is defined by a Global Positioning System (GPS) coordinates.

4. The mobile wireless communication device of claim 2, wherein the defined geographical location is defined by a street address.

5. The mobile wireless communication device of claim 2, the defined geographical location is defined by a mapping service marker code.

6. The mobile wireless communication device of claim 2, wherein the criteria comprise a defined geographical area, the criteria being met when the mobile device is located within the defined geographical area.

7. The mobile wireless communication device of claim 1, wherein:
the receiver is further configured to receive a log retrieval request from the base station; and
the transmitter is further configured transmit the MDT log report indicative of the MDT log to the base station in response to the log retrieval request.

8. The mobile wireless communication device of claim 1, wherein the log availability indicator indicates that the MDT log is event-based.

9. A method comprising:
receiving a Minimization of Drive Test (MDT) configuration comprising criteria for performing event-based logging, the criteria comprising a received signal threshold and the criteria being met when a signal strength of a received signal exceeds the received signal threshold;
determining if the criteria have been met;
in response to determining that the criteria have been met, performing an MDT in accordance with the MDT configuration, and log results of the MDT in the memory as an MDT log; and
transmitting, to a base station, a log availability indicator indicating the availability of the MDT log.

10. The method of claim 9, wherein the criteria comprise a defined geographical location, the criteria being met when the mobile device is at the defined geographical location.

11. The method of claim 10, wherein the defined geographical location is defined by a Global Positioning System (GPS) coordinates.

12. The method of claim 10, wherein the defined geographical location is defined by a street address.

13. The method of claim 10, wherein the defined geographical location is defined by a mapping service marker code.

14. The method of claim 10, wherein the criteria comprise a defined geographical area, the criteria being met when the mobile device is located within the defined geographical area.

15. The method of claim 9, further comprising:
receiving a log retrieval request from the base station; and
transmitting the MDT log report indicative of the MDT log to the base station in response to the log retrieval request.

16. The method of claim 9, wherein the log availability indicator indicates that the MDT log is event-based.

* * * * *